US010638314B2

(12) United States Patent
Park et al.

(10) Patent No.: US 10,638,314 B2
(45) Date of Patent: Apr. 28, 2020

(54) METHOD AND APPARATUS FOR DOWNLOADING A PROFILE IN A WIRELESS COMMUNICATION SYSTEM

(71) Applicant: Samsung Electronics Co., Ltd., Gyeonggi-do (KR)

(72) Inventors: Jonghan Park, Bucheon-si (KR); Duckey Lee, Seoul (KR); Taesun Yeom, Seoul (KR); Sangsoo Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/129,588

(22) Filed: Sep. 12, 2018

(65) Prior Publication Data

US 2019/0014467 A1    Jan. 10, 2019

Related U.S. Application Data

(63) Continuation of application No. 15/094,881, filed on Apr. 8, 2016, now Pat. No. 10,111,089.

(30) Foreign Application Priority Data

Apr. 8, 2015    (KR) .................. 10-2015-0049864

(51) Int. Cl.
*H04L 29/06* (2006.01)
*H04W 12/04* (2009.01)
(Continued)

(52) U.S. Cl.
CPC ........... *H04W 12/04* (2013.01); *H04L 9/0825* (2013.01); *H04L 9/0866* (2013.01); *H04W 12/0023* (2019.01)

(58) Field of Classification Search
CPC .................. H04W 12/04; H04W 12/0023; H04L 9/0825; H04L 9/0866
See application file for complete search history.

(56) References Cited

U.S. PATENT DOCUMENTS 9,807,605 B2    10/2017 Gao et al.
10,111,089 B2 *  10/2018 Park ..................... H04W 12/04
(Continued)

FOREIGN PATENT DOCUMENTS

CN    1509546 A    6/2004
CN    101431415 A    5/2009
(Continued)

OTHER PUBLICATIONS

Partial Supplementary European Search Report regarding Application No. 16776899.3, dated Dec. 21, 2017, 10 pages.
(Continued)

*Primary Examiner* — Sarah Su

(57) ABSTRACT

The present disclosure relates to a pre-5th-Generation (5G) or 5G communication system to be provided for supporting higher data rates beyond 4th-Generation (4G) communication system such as Long Term Evolution (LTE). A method for downloading profiles in a terminal in a wireless communication system include generating and storing an encryption key at a time point, loading the stored encryption key, when receiving profile download start information from a profile providing server, and downloading an encrypted profile for the electronic device from the profile providing server, via the loaded encryption key, and installing the encrypted profile in the electronic device. An electronic device configured to download a profile in a wireless communication system includes a memory, and a controller configured to generate an encryption key at a time point, store the encryption key in the memory, loading the stored encryption key, when receiving profile download start infor- (Continued)

mation from a profile providing server, and downloading an encrypted profile for the electronic device from the profile providing server, by using the loaded encryption key, and installing the downloaded profile.

20 Claims, 11 Drawing Sheets

(51) Int. Cl.
*H04L 9/08* (2006.01)
*H04W 12/00* (2009.01)

(56) References Cited

U.S. PATENT DOCUMENTS

| | | | | |
|---|---|---|---|---|
| 2002/0023217 | A1* | 2/2002 | Wheeler | G06F 21/32 713/171 |
| 2002/0080974 | A1 | 6/2002 | Grawrock | |
| 2009/0060197 | A1* | 3/2009 | Taylor | H04L 9/0618 380/277 |
| 2010/0062808 | A1* | 3/2010 | Cha | G06Q 20/3229 455/558 |
| 2011/0010543 | A1 | 1/2011 | Schmidt et al. | |
| 2012/0260090 | A1 | 10/2012 | Hauck et al. | |
| 2013/0254537 | A1* | 9/2013 | Bogorad | H04L 9/0822 713/165 |
| 2014/0003604 | A1 | 1/2014 | Campagna et al. | |
| 2014/0004827 | A1 | 1/2014 | O'Leary | |
| 2014/0219447 | A1 | 8/2014 | Park et al. | |
| 2015/0007348 | A1* | 1/2015 | Holtmanns | H04W 12/06 726/28 |
| 2015/0074780 | A1 | 3/2015 | Schell et al. | |
| 2015/0163056 | A1* | 6/2015 | Nix | H04L 9/0869 380/46 |
| 2015/0303966 | A1* | 10/2015 | Lee | H04B 1/3816 455/466 |
| 2015/0319151 | A1 | 11/2015 | Chastain et al. | |
| 2016/0006729 | A1 | 1/2016 | Yang et al. | |
| 2016/0021529 | A1* | 1/2016 | Park | H04W 8/205 455/410 |
| 2016/0050066 | A1* | 2/2016 | Loizides | H04L 9/0819 380/278 |
| 2016/0050557 | A1 | 2/2016 | Park et al. | |
| 2016/0117683 | A1 | 4/2016 | Jung et al. | |
| 2016/0142906 | A1* | 5/2016 | Park | H04W 8/205 455/419 |
| 2016/0241537 | A1* | 8/2016 | Cha | H04W 12/04 |
| 2016/0283216 | A1* | 9/2016 | Gao | H04W 8/20 |
| 2016/0301529 | A1* | 10/2016 | Park | H04W 12/10 |
| 2017/0064552 | A1* | 3/2017 | Park | H04W 12/06 |
| 2017/0142121 | A1* | 5/2017 | Lee | H04L 63/0823 |
| 2017/0155507 | A1* | 6/2017 | Park | H04W 8/18 |
| 2017/0156051 | A1 | 6/2017 | Park et al. | |
| 2017/0180349 | A1 | 6/2017 | Park | |
| 2019/0268765 | A1* | 8/2019 | Park | H04L 9/3247 |
| 2019/0324735 | A1* | 10/2019 | Park | H04W 12/06 |

FOREIGN PATENT DOCUMENTS

| | | |
|---|---|---|
| CN | 101459506 A | 6/2009 |
| CN | 101582906 A | 11/2009 |
| CN | 103731823 A | 4/2014 |
| EP | 2173055 A1 | 4/2010 |
| EP | 2858393 A1 | 4/2015 |
| WO | 2013/036011 A2 | 3/2013 |
| WO | 2014/059913 A1 | 4/2014 |

OTHER PUBLICATIONS

International Search Report dated Jul. 19, 2016 in connection with International Application No. PCT/KR2016/003693, 4 pages.
Office Action dated Feb. 3, 2020 in connection with Chinese Patent Application No. 201680020522.5, 19 pages.

* cited by examiner

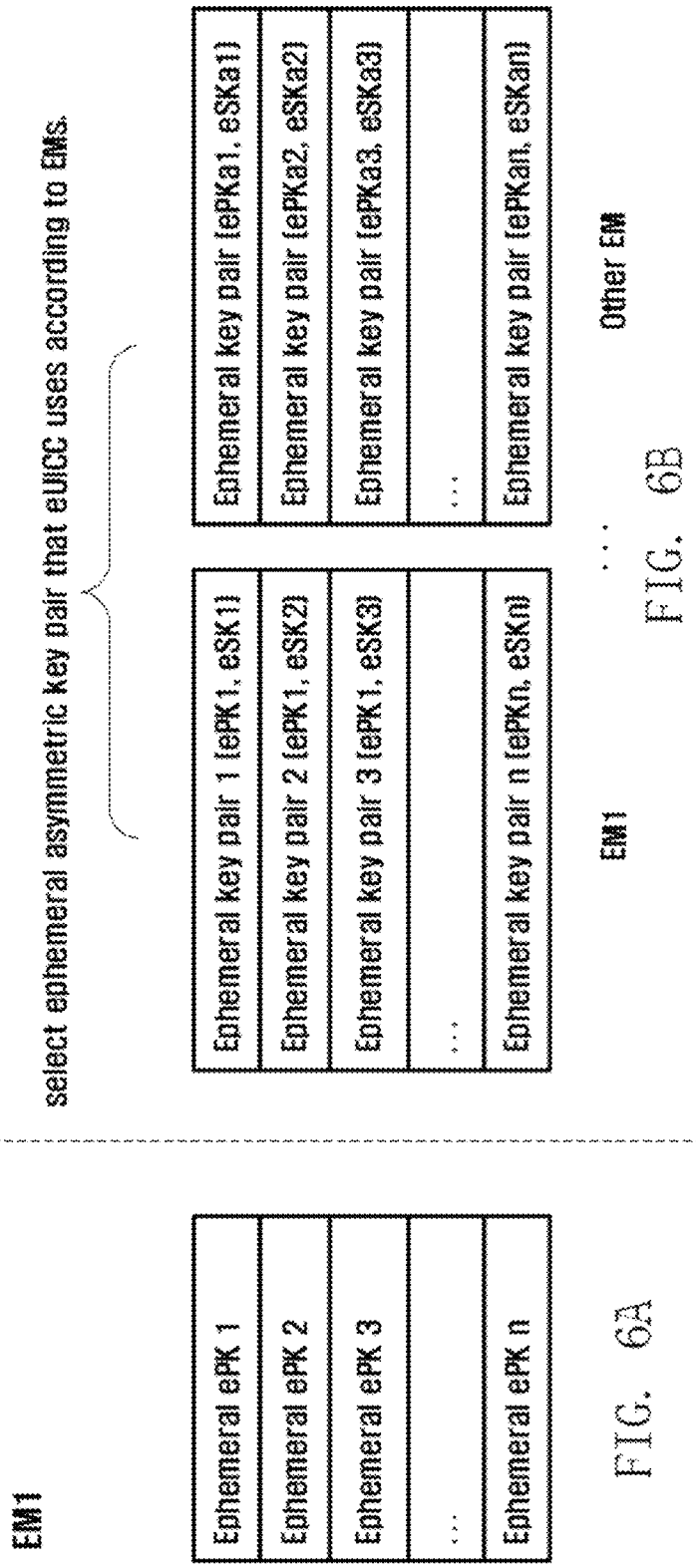

METHOD AND APPARATUS FOR DOWNLOADING A PROFILE IN A WIRELESS COMMUNICATION SYSTEM

CROSS-REFERENCE TO RELATED APPLICATION AND CLAIM OF PRIORITY

The present application is a continuation of U.S. patent application Ser. No. 15/094,881 filed on Apr. 8, 2016, which is based on and claims priority under 35 U.S.C. § 119 to Korean Patent Application No. 10-2015-0049864 filed on Apr. 8, 2015, the disclosures of which are hereby incorporated by reference in their entirety.

BACKGROUND

1. Field

The present disclosure relates to wireless communication systems, and more particularly, to a method and apparatus for installing a profile for providing communication services in a terminal. More specifically, this disclosure is related to a method and apparatus that enables a terminal and a server transmitting a profile to authenticate each other, so that the terminal receives encrypted profile information from the server and thus uses communication services.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A Universal Integrated Circuit Card (UICC) refers to a smart card which: is inserted in a mobile communication device; has personal information about a mobile communication subscriber, such as network access authentication information, a phonebook, Short Message Service (SMS), etc., stored therein; and performs subscriber authentication and traffic security key generation when the mobile communication device is connected to a mobile communication network such as Global System for Mobile Communications (GSM), Wideband Code Division Multiple Access (WCDMA), Long Term Evolution (LTE), etc., thereby enabling it to perform safe mobile communication. UICC has communication applications mounted therein, e.g., Subscriber Identification Module (SIM), Universal SIM (USIM), or Internet Protocol (IP) multimedia SIM (ISIM), etc., depending on types of mobile communication network. UICC also provides an upper-level security function for mounting various applications such as an electronic wallet, ticketing, electronic passports, etc.

In the manufacturing process, conventional UICCs are manufactured as a dedicated card for a specific mobile communication operator according to their demand. That is, conventional UICCs have authentication information about connecting to a network of a corresponding communication operator (e.g., USIM applications and subscriber identifier such as International Mobile Subscription Identifier (IMSI)), an encryption key (e.g., K value or Ki value), installed therein, and are delivered to the communication operator. The communication operator provides manufactured UICCs to the subscribers, and performs management of applications in the UICC, such as installation, update, deletion, etc., via Over-The-Air (OTA), etc. Subscribers insert UICC into their mobile communication device and use applications via the network of the communication operation. When replacing a mobile communication device with a new device, the subscriber can move the UICC from the old device to the new one, so that he/she can use authentication information, mobile phone numbers, personal phonebook, etc., stored in the UICC, via the new mobile communication device.

UICC was defined, in terms of physical forms and logical functions, by the European Telecommunications Standards Institute (ETSI), to retain the international compatibility. From the viewpoint of the Form Factor defining the physical form, UICC decreases in size from the commonly used Mini SIM to the recently introduced Nano SIM, including Micro SIM that has been used for a few years. This change in size contributes to the minimization of mobile communication devices. However, regarding UICC smaller in size than Nano SIM that has been recently standardized, it will be difficult to standardize the UICC due to concern that users may lose it. In particular, since a removable UICC needs mobiles devices to secure a space for mounting a removable slot, UICC may not need to be smaller than Nano SIM.

In various devices such as intelligent home appliances, electricity meters, water meters, CCTV cameras, etc. it may not be appropriate to use removable UICC for Machine-to-Machine (M2M) devices which need connection to a mobile communication data network without a user's direct operation.

In order to resolve the problems, a method may be considered to substitute convention removable UICCs by embedding a security module, configured to perform functions similar to those of UICC, in mobile communication devices in the process of manufacturing mobile communication devices. The security modules may be installed to mobile communication devices during the manufacturing process or fixed to mobile communication devices. Therefore, as long as UICCs are not manufactured for dedicated mobile communication devices for a particular mobile communication operator, it may be difficult for UICCs to contain network access authentication information of a particular mobile communication operator, such as K, IMSI of USIM, in the process of manufacturing mobile communication devices. Therefore, the authentication information may be set only in a mobile communication device that is purchased and then subscribed to a particular mobile communication operation.

Unlike conventional UICCs that have been manufactured and distributed as cards dedicated to a particular mobile communication operator, as a user who purchase a mobile communication device performs: subscription to and withdrawal from a particular mobile communication operator; or alteration of a subscription to another operator, a new method is required to perform safe and flexible installation and management of authentication information related to various mobile communication operators in a UICC and an eUICC serving as a new security module configured to be embedded in a mobile communication device.

SUMMARY

To address the above-discussed deficiencies, it is a primary object to provide at least the advantages described below. Accordingly, various embodiments provide a method and apparatus for remotely, wirelessly installing a profile for providing communication services to a terminal including a UICC (e.g., an eUICC, a removable UICC, etc.) in a wireless communication network.

The present disclosure provides a method and apparatus for improving the processing speed of a UICC connected to a terminal when the terminal performs authentication for security during the remote installation of a profile.

In the following description, the term UICC refers to a UICC which includes an eUICC or a removable UICC and is capable of downloading and installing a profile therein in a remote mode.

In accordance with an aspect of the present disclosure, a method for an electronic device to download a profile in a wireless communication system is provided. The method includes: generating and storing an encryption key at a time point; loading the stored encryption key, when receiving profile download start information from a profile providing server; and downloading an encrypted profile for the electronic device from the profile providing server, via the loaded encryption key, and installing it therein.

In accordance with another aspect of the present disclosure, an electronic device configured to download a profile in a wireless communication system is provided. The electronic device includes: a memory; and a controller for: generating an encryption key at a time point; storing the encryption key in the memory; loading the stored encryption key, when receiving profile download start information from a profile providing server; and downloading an encrypted profile for the electronic device from the profile providing server, by using the loaded encryption key, and installing the downloaded profile.

In accordance with another aspect of the present disclosure, a method of managing profiles in a profile management server in a wireless communication system is provided. The method includes: generating and storing a number of ephemeral public keys; mapping the stored, ephemeral public keys to a number of electronic devices; transmitting the ephemeral public keys to a profile providing server; and receiving, from the profile providing server, encrypted profiles for the electronic devices, based on the ephemeral public keys.

In accordance with another aspect of the present disclosure, a profile management server for managing profiles in a wireless communication system is provided. The profile management server includes: a transceiver for performing transmission/reception of signals; a memory for storing a number of ephemeral public keys; and a controller for: mapping the stored, ephemeral public keys to a number of electronic devices; transmitting the ephemeral public keys to a profile providing server; and receiving, from the profile providing server, encrypted profiles for the electronic devices, based on the ephemeral public keys.

Preferably, the electronic device may include a Universal Integrated Circuit Card (UICC) or an embedded UICC (eUICC).

The UICC may be connected to a terminal via a separate interface or embedded in the terminal.

In accordance with another aspect of the present disclosure, a method of installing profiles in an eUICC or a terminal with an eUICC in a wireless communication system is provided. The method includes: generating and storing one or more ephemeral (temporary) asymmetric key pairs; performing mutual authentication, by using one or more of the stored, temporary asymmetric key pairs or one or more temporary asymmetric key pairs stored in an eUICC in the process of manufacture; deleting the used, temporary asymmetric key pair when the profile is downloaded and installed; and, when the temporary asymmetric key pairs are deleted and there is a temporary asymmetric key pair which has a value less than a threshold, automatically generating and storing one or more temporary asymmetric key pairs.

In accordance with another aspect of the present disclosure, a manufacturer eUICC management server of a wireless communication system performs at least one of the following: requesting the generation of one or more encrypted profiles from a profile providing server, via one or more temporary asymmetric key pairs which corresponds to one or more eUICCs and have previously been stored; signing information including part or all of the encrypted profiles, by a certificate private key of the manufacturer eUICC management server, when one or more encrypted profiles is requested from the profile providing server; and transmitting the encrypted profile and the signature information to the terminal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 6A and 6B show diagrams that describe a method of managing an ephemeral asymmetric key pair in an eUICC according to an embodiment of the present disclosure;

DETAILED DESCRIPTION

Figure 1:
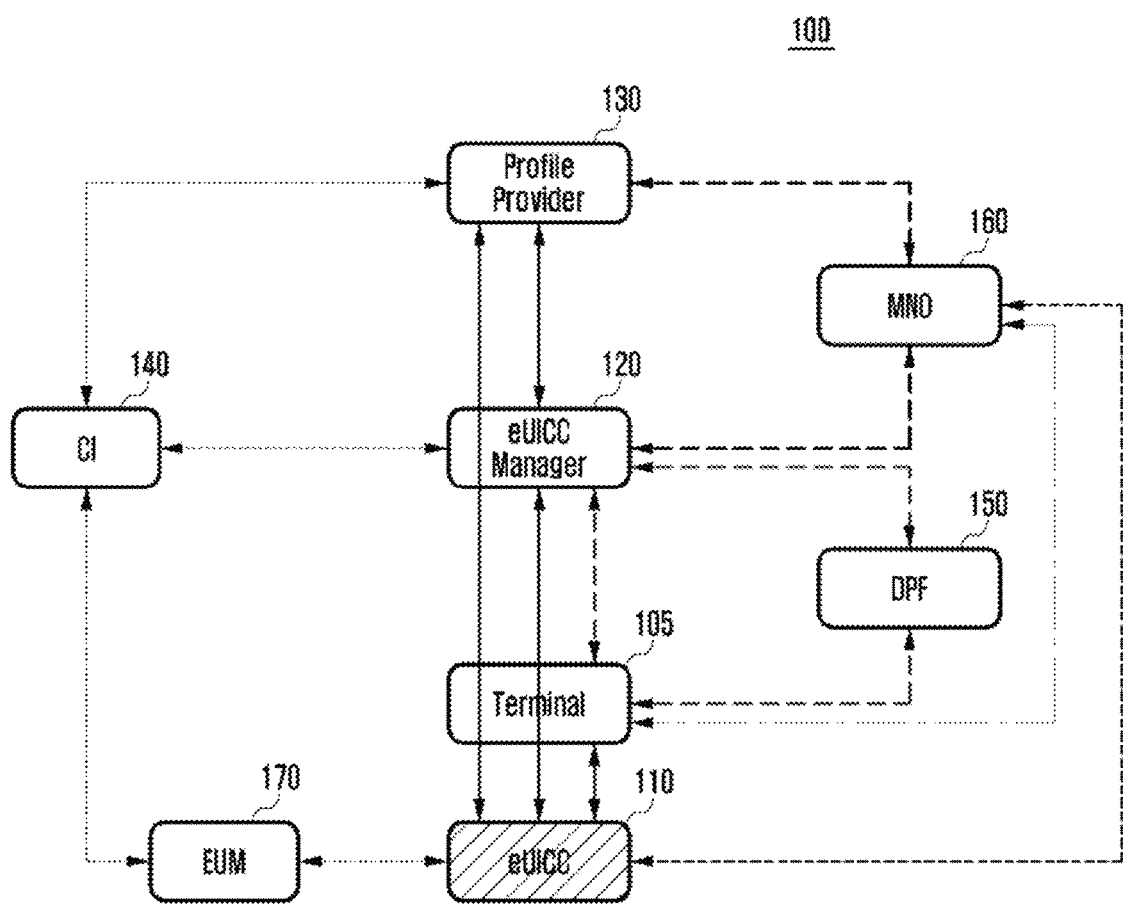
FIG. 1 is a block diagram showing a wireless communication system 100 configured to remotely transmit/receive a profile for providing communication services according to embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies. Hereinafter, embodiments of the present disclosure are described in detail with reference to the accompanying drawings.

Detailed descriptions of well-known functions and structures incorporated herein are omitted to avoid obscuring the subject matter of the disclosure.

The drawings are not necessarily to scale and certain features may be exaggerated, omitted, or simplified in order to better illustrate and explain the disclosure. The same reference numbers are used throughout the drawings to refer to the same or similar parts.

The features and advantages of the disclosure and the method to achieve them will become more apparent from the following detailed description in conjunction with the accompanying drawings. It will be easily appreciated to those skilled in the art that various modifications, additions and substitutions are possible from the embodiments of the disclosure that are illustrated and described in detail in the following description, and the scope of the disclosure should not be limited to the following embodiments. The embodiments of the present disclosure are provided such that those skilled in the art will completely understand the disclosure. It should be understood that the disclosure may include all modifications and/or equivalents and/or substitutions included in the idea and technical scope of the present disclosure. In the drawings and description, the same or similar elements are denoted by the same reference numerals even though they are depicted in different drawings.

It should be understood that the processes, operations, and a combination thereof in the flowcharts can be performed via computer programming instructions. These computer programming instructions can be installed to processors of data processing equipment that can be programmed, special computers, or universal computers. The instructions, performed via the processors of data processing equipment or the computers, can generate means that perform functions described in blocks of the flowchart. In order to implement functions in a particular mode, the computer programming instructions can also be stored in a computer available memory or computer readable memory that can support computers or data processing equipment that can be programmed. Therefore, the instructions, stored in the computer available memory or computer readable memory, can be installed to the products, and perform the functions therein, described in the blocks of the flowchart therein. In addition, since the computer programming instructions can also be installed to computers or data processing equipment that can be programmed, they can generate processes that perform a series of operations therein, described in the blocks of the flowchart therein.

The blocks of the flowchart refer to part of codes, segments or modules that include one or more executable instructions to perform one or more logic functions. It should be noted that the functions described in the blocks of the flowchart may be performed in a different order from the embodiments described above. For example, the functions described in two adjacent blocks may be performed at the same time or in reverse order.

In the embodiments, the terminology, component '~unit,' refers to a software element or a hardware element such as a PGGA, an ASIC, etc., and performs a corresponding function. It should be, however, understood that the component '~unit' is not limited to a software or hardware element. The component '~unit' may be implemented in storage media that can be designated by addresses. The component '~unit' may also be configured to regenerate one or more processors. For example, the component '~unit' may include various types of elements (e.g., software elements, object-oriented software elements, class elements, task elements, etc.), segments (e.g., processes, functions, achieves, attribute, procedures, sub-routines, program codes, etc.), drivers, firmware, micro-codes, circuit, data, data base, data structures, tables, arrays, variables, etc. Functions provided by elements and the components '~units' may be formed by combining the small number of elements and components '~units' or may be divided into additional elements and components '~units.' In addition, elements and components '~units' may also be implemented to regenerate one or more CPUs in devices or security multi-cards.

Detailed descriptions of well-known functions and structures incorporated herein are omitted to avoid obscuring the subject matter of the disclosure. Embodiments of the present disclosure are described in detail with reference to the accompanying drawings.

Terms used in the present disclosure are defined as follows. They may be defined as terms used by one skilled in the art, and also be used to describe operations and features related to embodiments of the present disclosure.

Universal Integrated Circuit Cards (UICCs) are used as devices, e.g., an embedded UICC (eUICC), which are capable of downloading a profile and installing it therein in terms of function, and are detachably installed in a terminal or embedded in a terminal, in terms of physical structure.

For example, a Universal Integrated Circuit Card (UICC) refers to a chip as a smart card which: is inserted in a mobile communication device; has personal information about a mobile communication subscriber, such as network access authentication information, a phonebook, Short Message Service (SMS), etc., stored therein; and performs subscriber authentication and traffic security key generation when the mobile communication device is connected to a mobile communication network such as Global System for Mobile Communications (GSM), Wideband Code Division Multiple Access (WCDMA), Long Term Evolution (LTE), etc., thereby enabling it to perform safe mobile communication. UICC has communication applications mounted therein, e.g., Subscriber Identification Module (SIM), Universal SIM (USIM), or Internet Protocol (IP) multimedia SIM (ISIM), etc., depending on types of mobile communication network. UICC also provides an upper-level security function for mounting various applications such as an electronic wallet, ticketing, electronic passports, etc.

For example, although the embodiments are described assuming that an embedded UICC (eUICC) as an example of the UICC is a chip type of security module which is embedded in a terminal so that it cannot be removed from the terminal; the present disclosure can also be applied to removable type of UICCs like conventional UICCs only if the removable UICCs include the same functions, software characteristics, electrical characteristics as the eUICC.

UICC or eUICC can also refer to an electronic device or a small electronic device. An electronic device including a UICC or an eUICC, which will be described later with the accompanying drawings, is capable of including a controller for processing signals, and a memory for storing profiles therein. In particular, the electronic device can further include an interface for connecting to a terminal when the electronic device is implemented to be detachably connected to the terminal.

UICC is capable of downloading a profile via a general IP network such as a wireless communication network, WiFi, etc., and installing it therein. Various embodiments of the present disclosure can employ UICC regardless of types of a network downloading a profile.

A profile can refer to a type of software generated by packaging at least one of the following: an application, a file system, and a certificate key value, stored in the UICC.

A USIM profile can have the same meaning as a profile or refer to a type of software generated by packing information contained in a USIM application within a profile.

A profile provider (PP) can be referred to as a Subscription Manager Data Preparation (SM-DP), Subscription Manager Data Preparation Plus (SM-DP+), a profile providing server, an off-card entity of profile domain, a profile encryption server, a profile generation server, a profile provisioner, etc.

An eUICC Manager (EM) can be referred to as a Subscription Manager Secure Routing (SM-SR), Subscription Manager Secure Routing Plus (SM-SR+), a profile management server, an off-card entity of eUICC Profile Manager, Profile Manager, Manufacturing Server, Offline Provisioning Server, etc.

The term 'terminal' can be referred to as mobile station (MS), user equipment (UE), a user terminal (UT), a wireless terminal, an access terminal (AT), terminal, a subscriber unit, a subscriber station (SS), a wireless device, a wireless communication device, a wireless transmit/receive unit (WTRU), a mobile node, a mobile, etc. The term 'terminal' can also be used to include the following concept: a cellular phone, a smartphone with a wireless communication function, a personal digital assistant (PDA) with a wireless communication function, a wireless modem, a portable computer with a wireless communication function, a digital camera or any other equivalent having a wireless communication function, a gaming device with a wireless communication function, a music player or any other equivalent having a wireless communication function, home appliances capable of wireless internet access and browsing, and any portable unit or device having combinations of the components listed above. The term 'terminal' can also be used to include measurements with a communication function.

The terminal can also include, but is not limited to, a machine-to-machine (M2M) device or a machine-type communication (MTC) terminal/device.

A UICC terminal can also be referred to as a terminal using an UICC.

A profile identifier (ID) can be referred to as profile identification information, a profile ID, an Integrated Circuit Card ID (ICCID), a factor matched to ICCID and International Subscriber Dialing Preparation (ISD-P), etc. The Profile ID can indicate a unique ID of each profile. A profile identifier can also be used to identify a profile on a network.

A UICC identifier can be a unique identifier of UICC within a terminal. The UICC identifier can also be referred to as a UICC identifier or an eUICC ID (EID).

In the following description, for the sake of convenience, UICC downloading a profile and installing it therein is described as the term 'eUICC'.

FIG. 1 is a block diagram showing a wireless communication system 100 configured to remotely transmit and/or receive a profile for providing communication services according to embodiments of the present disclosure.

Referring to FIG. 1, the wireless communication system is capable of including at least one of the following: a terminal 105, an eUICC 110, an eUICC manager 120, a profile provider 130, a Certificate Issuer (CI) 140, a Discovery & Push Function (DPF) 150, a Mobile Network Operator (MNO) system 160, an eUICC Manufacturer (EUM) 170. The CI can also be referred to as Certificate Authority (CA).

The terminal 105 is connected to a wireless communication network in the wireless communication system, installs profiles therein via the transmission/reception of signals to/from the eUICC 110, selects one of the installed profiles, deletes an installed profile, or initializes the setting of the eUICC and the profile.

The eUICC 110 installs profiles therein via the transmission/reception of signals to/from the terminal 105, selects one of the profiles, deletes a profile, or initializes the setting of the eUICC and the profile.

The eUICC 110 is capable of storing a CI public key or a CI certificate. The eUICC 110 is also capable of storing its certificate and private key. The eUICC 110 is capable of authenticating a profile provider having a private key and a certificate issued from the same CI or a sub CI (Sub CI) subsidiary to the CI, using its certificate and private key.

The eUICC 110 is capable of authenticating an eUICC manager having a private key and a certificate issued from a CI corresponding to its CI public key or a Sub CI subsidiary to the CI.

The eUICC 110 is capable of storing a number of CI public keys or CI certificates and using them to perform authentication or signature verification of the eUICC manager 120 or the profile provider 130.

The eUICC manager 120 is capable of transmitting information required to start downloading a profile, via the transmission/reception of signals to/from the DPF 150.

The eUICC manager 120 is capable of performing the certificate-based authority verification in order to manage the eUICC. The certification of the eUICC manager 120 can represent a business entity such as the terminal manufacturer, the MNO 160, etc. The eUICC 110 can also verify the eUICC management performed by the eUICC manager 120, based on the certificate of the eUICC manager 120.

The eUICC manager 120 is capable of managing profiles. The profile can refer to a type of software generated by packaging at least one of the following: an application, a file system, and a certificate key value, stored in the UICC. For example, the eUICC manager 120 is capable of performing profile management, such as Profile Download, Profile Enable and Disable, Profile Deletion, etc.

The profile provider 130 is capable of generating a profile package and encrypting the profile package.

The DPF 150 is capable of assisting in searching for the eUICC manager 120 to which the eUICC 110 needs to connect, in order to process eUICC management events in a waiting state. For example, on an IP Network, the DPF 150 can transmit eUICC management events to the eUICC 110 in a Push method.

The terminal 105 is capable of transmitting and/or receiving information required to start downloading a profile, via the transmission and/or reception of signals to or from the DPF.

The MNO system 160 is capable of including a terminal within a communication company agent, an MNO server, an MNO Business support system (MNO BSS), etc. For example, the terminal within a communication company agent can obtain information related to eUICC terminal when the eUICC terminal is subscribed via the agent. The MNO server can include an on-line portal server of the MNO and allow eUICC terminals to subscribe to a communication company via the on-line portal server, and obtain information related to the eUICC terminals The MNO Business support system (MNO BSS) is capable of transmitting the obtained information related to eUICC terminals to the profile provider.

In various embodiments of the present disclosure, the profile includes a subscriber identify of a terminal (e.g., International Mobile Subscriber Identity (IMSI)), an encryption key for authentication (e.g., K), and various information regarding communication services providing a corresponding communication operator.

Figure 2A:
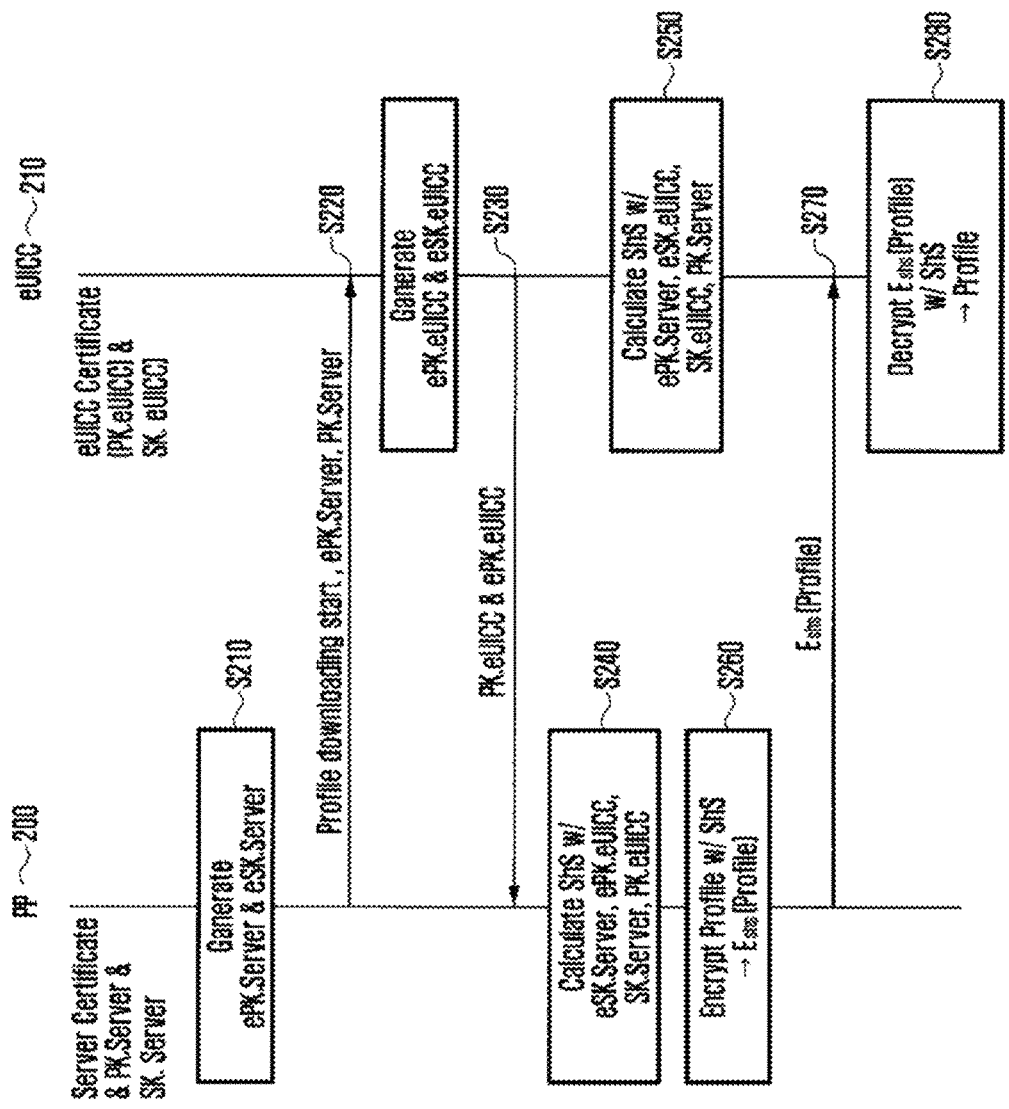
FIGS. 2A and 2B show flowcharts that describe a method of encrypting a UICC-related profile, and performing remote transmission and installation of the profile in a wireless communication system according to embodiments of the present disclosure.
Figure 2B:
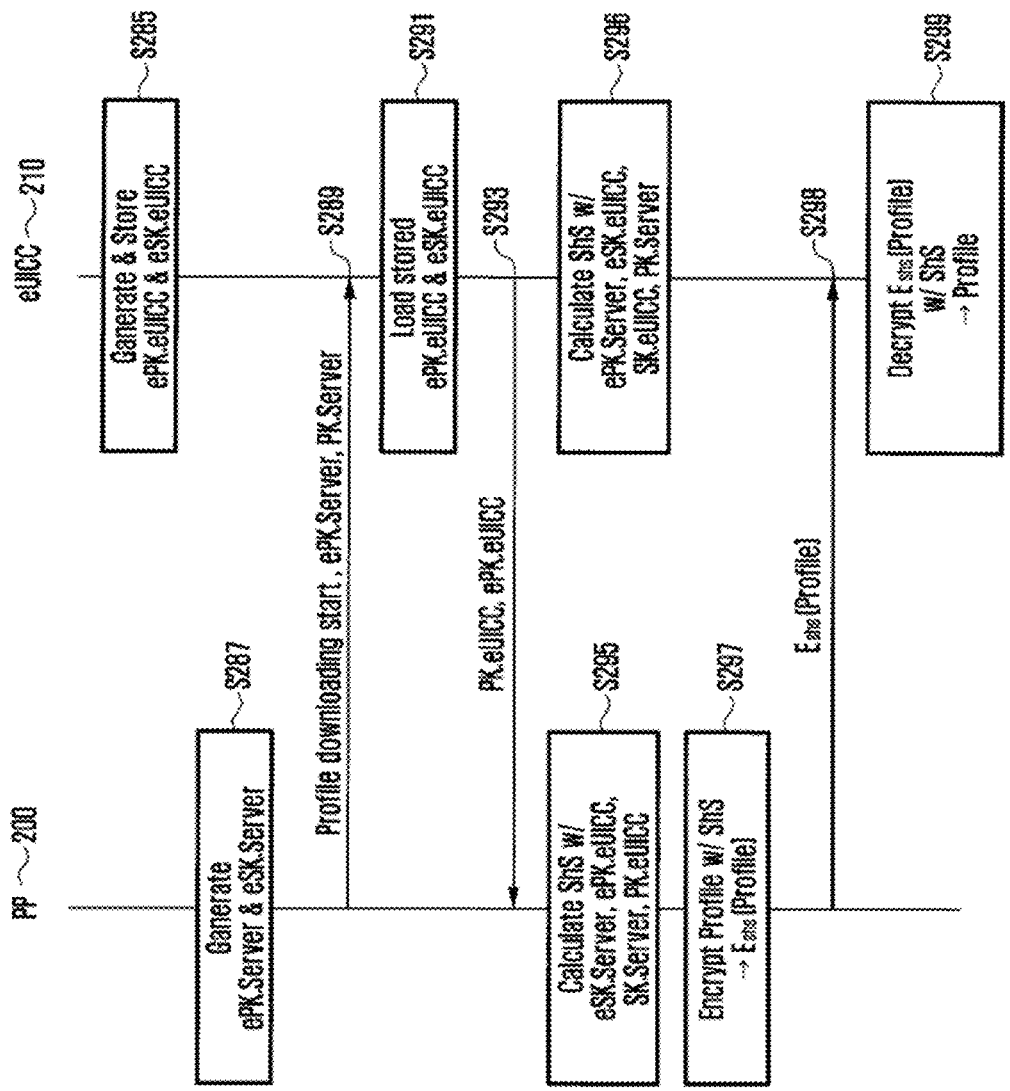

FIGS. 2A and 2B show flowcharts that describe a method of encrypting a UICC-related profile, and performing remote transmission and installation of the profile in a wireless communication system according to embodiments of the present disclosure.

The method shown in FIG. 2A includes a process for an eUICC to generate an ephemeral asymmetric key pair according to an embodiment of the present disclosure. The method shown in FIG. 2B includes a process for an eUICC to load a previously generated ephemeral asymmetric key pair according to another embodiment of the present disclosure.

Referring to FIG. 2A, the profile provider (PP) 200 has its certificate (e.g., Server Certificate), its public key (e.g., PK.Server) and its private key (e.g., SK.Server). The expression 'PK' refers to Public Key and 'SK' refers to Secret Key or Private Key, which will also be used in the following description.

Unlike an 'ephemeral asymmetric key pair' which will be described later, the public key and the private key of the PP 200 are a static asymmetric key pair which is stored in the PP 200 and repeatedly used. The asymmetric key pair can be used for Elliptic Curved Key Agreement.

The eUICC 210 has its certificate (e.g., eUICC Certificate), its public key (e.g., PK.eUICC) and its private key (e.g., SK.eUICC).

Unlike an 'ephemeral asymmetric key pair', the public key and private key of the eUICC 210 are a static asymmetric key pair which is stored in the eUICC 210 and repeatedly used. The asymmetric key pair can be used for Elliptic Curved Key Agreement.

The PP 200 is capable of generating an ephemeral asymmetric key pair for Elliptic Curved Key Agreement in operations S210 and S287. The ephemeral asymmetric key pair can include an ephemeral public key (e.g., ePK.Server) and an ephemeral private key (e.g., eSK.Server).

One of the features according to embodiments of the present disclosure is to use an ephemeral asymmetric key pair in order to encrypt a profile to be installed in a terminal and to transmit the encrypted profile to the terminal.

Although the embodiments use the expression 'ephemeral' indicating 'once or one-time', it should be understood that it can also refer to a preset number of times or the number of uses within a preset period of time. Therefore, it should be understood that the expression 'ephemeral' is just used for the sake of convenient description but not limited to only 'one time or once'. In particular, 'ephemeral' can be also be used in the sense of the term 'temporary'.

The PP 200 is capable of transmitting, to the eUICC 210, the PP public key (e.g., PK.Server) and the ephemeral PP public key (e.g., ePK.Server) in operation S220. Although it is not shown, the transmission from the PP 200 to the eUICC 210 can be performed via the eUICC Manager (EM) and the terminal. For example, the PP public key and the ephemeral PP public key can be transmitted to the terminal via the EM, and then to the eUICC via the terminal and the signaling of the eUICC.

The PP private key (SK.Server) and the ephemeral PP private key (eSK.Server) refer to values that are securely stored in the PP 200, not output/transmitted to external devices.

When receiving information for starting to download a profile (e.g., a command for starting to download a profile, an identifier, information or ePK.Server, PK.Server value, etc.), the eUICC 210 is capable of generating an ephemeral asymmetric key pair for Elliptic Curved Key Agreement in operation S220.

The ephemeral asymmetric key pair can include an ephemeral public key (e.g., ePK.eUICC) and an ephemeral private key (e.g., eSK.eUICC).

The eUICC 210 is capable of transmitting, to the PP 200, the eUICC public key (e.g., PK.eUICC) and one time eUICC public key (e.g., ePK.eUICC) in operation S230. Although it is not shown, the transmission from the eUICC 210 to the PP 200 can be performed via the terminal and the eUICC Manager (EM). For example, the eUICC public key and the one time eUICC public key can be transmitted to the terminal via the eUICC and the signaling of the terminal, and then to the eUICC via the terminal.

The eUICC private key (SK.eUICC) and the ephemeral eUICC private key (eSK.eUICC) refer to values that are securely stored in the eUICC, not output/transmitted to external devices.

When the PP 200 and the eUICC 210 exchange information with each other as described above, they are capable of generating the same shared key for encryption and decryption.

The PP 200 is capable of generating a shared key (e.g., ShS: Shared Secret) by using the eUICC public key and the one time eUICC public key, transmitted from the eUICC 210, and the PP private key and the ephemeral PP private key, stored in the PP 200, in operation S240.

The shared key of operation S240 can be generated by using the Elliptic Curved Key Agreement algorithm. The shared key can be one key or a set of two keys.

In contrast, the eUICC 210 is capable of generating a shared key (e.g., ShS: Shared Secret), by using the PP public key and the ephemeral PP public key, transmitted from the PP 200, and the eUICC private key and the ephemeral eUICC private key, stored in the eUICC 210, in operation S250.

The shared key of operation S250 can be generated by using the Elliptic Curved Key Agreement algorithm.

Although the PP 200 and the eUICC 210 share their public keys and ephemeral public keys with each other but do not share their private keys and ephemeral private keys, they can generate the same key. This is because they use an asymmetric key pair, according to embodiments of the present disclosure.

The PP 200 is capable of encrypting profile information (e.g., Profile) based on the generated, shared key in operation S260. Although it is not shown, the profile information can be divided into a number of portions, and the individual portions are encrypted or part of the portions is encrypted.

For the sake of convenience, the summation of part of profile information, encrypted, and another part of profile information, not encrypted, is called an encrypted profile.

The PP 200 is capable of transmitting the encrypted profile, e.g., $E_{ShS}$ (Profile), to the eUICC 210 in operation S270.

Although it is not shown, the transmission from the PP 200 to the eUICC 210 can be performed via the eUICC Manager (EM) and the terminal.

The eUICC 210 decodes the encrypted profile by using the shared key generated in the eUICC 210 and installs the decoded result therein in operation S280.

After that, the eUICC 210 can delete the used, ephemeral eUICC private key (eSK.eUICC). In this case, the eUICC 210 can also delete the ephemeral public key used together with the ephemeral private key.

Although the eUICC private key (SK.eUICC) is revealed after the ephemeral eUICC private key has been deleted, it is impossible to generate the shared key in an entity (e.g., EM or terminal or devices on a network), that is not the PP 200 and the eUICC 210. Even if the encrypted profile ($E_{ShS}$ (Profile)), PP public key, ephemeral PP public key, and one time eUICC public, which were transmitted via the entity, key are stored before the eUICC private key (SK.eUICC) is revealed, since the ephemeral private key has been deleted, the encrypted profiles transmitted before deletion can be safely protected.

The foregoing description explains the generation of an ephemeral asymmetric key pair and the encryption using the generated key pair referring to FIG. 2A. The following description explains another embodiment regarding the generation of an ephemeral asymmetric key pair and the encryption using the generated key pair referring to FIG. 2B.

Referring to FIG. 2B, unlike the embodiment shown in FIG. 2A, the eUICC 210 generates and stores an ephemeral asymmetric key pair before starting to download a profile in operation S285.

The ephemeral asymmetric key pair can be one of a number of ephemeral asymmetric key pairs which are generated and stored at the following time point.

- The ephemeral asymmetric key pair is generated and stored at a time point that eUICC is manufactured (e.g., a number of asymmetric key pairs have been generated and stored, and one of these can be used for the ephemeral asymmetric key pair)
- When a profile has been downloaded and installed and then an ephemeral private key used in the process of downloading the profile is deleted, the ephemeral asymmetric key pair is generated and stored from a time point after deletion
- When the number of ephemeral asymmetric key pairs, periodically or non-periodically stored, is checked, and s less than or equal to a threshold (e.g., 1, 2, 3, or the like), the ephemeral asymmetric key pair is generated and stored from a time point after checking (refer to FIG. 3)
- When a terminal transmits a command, Application Protocol Data Unit (APDU), for requesting the generation of an ephemeral asymmetric key pair, the eUICC generates an ephemeral asymmetric key pair and stores it therein.

After that, the processes of the embodiment shown in FIG. 2B are the same as the embodiment of FIG. 2A, except for the following operations.

When the eUICC 210 receives information for starting to download a profile (e.g., a command for starting to download a profile, an identifier, information or ePK.Server, PK.Server value, etc.) in operation S289, it performs the following operations. For example, the eUICC 210 loads (reads) a pre-stored, ephemeral asymmetric key pair (e.g., ePK.eUICC and eSK.eUICC), which is generated and stored in, e.g., operation S285, and uses it for the process of downloading a profile in operation S291.

More specifically, the eUICC 210 is capable of transmitting, to the PP 200, the eUICC public key (e.g., PK.eUICC) and the one time eUICC public key (e.g., ePK.eUICC) in operation S293. Although it is not shown, the transmission from the eUICC 210 to the PP 200 can be performed via the terminal and the eUICC Manager (EM). For example, the eUICC public key and the one time eUICC public key can be transmitted to the terminal via the eUICC and the signaling of the terminal, and then to the eUICC via the terminal.

When the PP 200 and the eUICC 210 exchange information with each other as described above, they are capable of generating the same shared key for encryption and decryption.

The PP 200 is capable of generating a shared key (e.g., ShS: Shared Secret) by using the eUICC public key and the one time eUICC public key, transmitted from the eUICC 210, and the PP private key and the ephemeral PP private key, stored in the PP 200, in operation S295.

The shared key of operation S295 can be generated by using the Elliptic Curved Key Agreement algorithm. The shared key can be one key or a set of two keys.

In contrast, the eUICC 210 is capable of generating a shared key (e.g., ShS: Shared Secret), by using the PP public key and the ephemeral PP public key, transmitted from the PP 200, and the eUICC private key and the ephemeral eUICC private key, stored in the eUICC 210, in operation S296.

The shared key of operation S296 can be generated by using the Elliptic Curved Key Agreement algorithm.

Although the PP 200 and the eUICC 210 share their public keys and ephemeral public keys with each other but do not share their private keys and ephemeral private keys, they can generate the same key. This is because they use an asymmetric key pair, according to embodiments of the present disclosure.

The PP 200 is capable of encrypting profile information (e.g., Profile) based on the generated, shared key in operation S297. Although it is not shown, the profile information can be divided into a number of portions, and the individual portions are encrypted or part of the portions is encrypted.

The PP 200 is capable of transmitting the encrypted profile, e.g., $E_{ShS}$ (Profile), to the eUICC 210 in operation S298.

Although it is not shown, the transmission from the PP 200 to the eUICC 210 can be performed via the eUICC Manager (EM) and the terminal.

The eUICC 210 decodes the encrypted profile by using the shared key generated in the eUICC 210 and installs the decoded result therein in operation S299.

After that, the eUICC 210 can delete the used, ephemeral eUICC private key (eSK.eUICC). In this case, the eUICC 210 can also delete the ephemeral public key used together with the ephemeral private key.

In another embodiment, when the eUICC 210 does not have an ephemeral asymmetric key pair stored therein in operation S291, it can generate an ephemeral asymmetric key pair and uses it for the process of downloading a profile.

The method of the embodiment referring to FIG. 2 uses an ephemeral asymmetric key pair which has been previously generated or stored, thereby reducing a period of time from a time point that a profile starts to be downloaded. That is, one of the features according to embodiments of the present disclosure is to transmit or download a profile, using an ephemeral asymmetric key pair that has been previously generated or stored.

When the number of ephemeral asymmetric key pairs which have been previously generated or stored is two or more, the ephemeral asymmetric key pairs can be stored in various types of storage modes representing the information regarding the number, such as in a list form, in an array form, etc.

The asymmetric key pairs which have been previously generated or stored can be stored in a non-volatile memory or a volatile memory.

Although it is not shown, the pre-generation of the ephemeral asymmetric key pair can be performed continuously or intermittently. When the pre-generation of the ephemeral asymmetric key pair is performed continuously, the UICC can perform another function after ending the pre-generation. When the pre-generation of the ephemeral asymmetric key pair is performed intermittently, the UICC can start, stop or resume the pre-generation and another operation at intervals, alternatively, repeatedly. According to an embodiment of the present disclosure, the UICC can simultaneously perform the pre-generation of the ephemeral asymmetric key pair and another operation, i.e., multi-tasking.

The UICC can perform, stop or trigger the pre-generation of an ephemeral asymmetric key pair by the following methods:

A method of allowing an UICC to arrange APDU commands with the priority; and to set the asymmetric key pair generating operations with the priority and processing an APDU command with a higher priority prior to the asymmetric key pair generating operation;

A method of allowing a terminal to start the asymmetric key pair generating operation through an APDU command; and A method of allowing a terminal to start stopping the asymmetric key pair generating operation thorough an APDU command.

Figure 3:
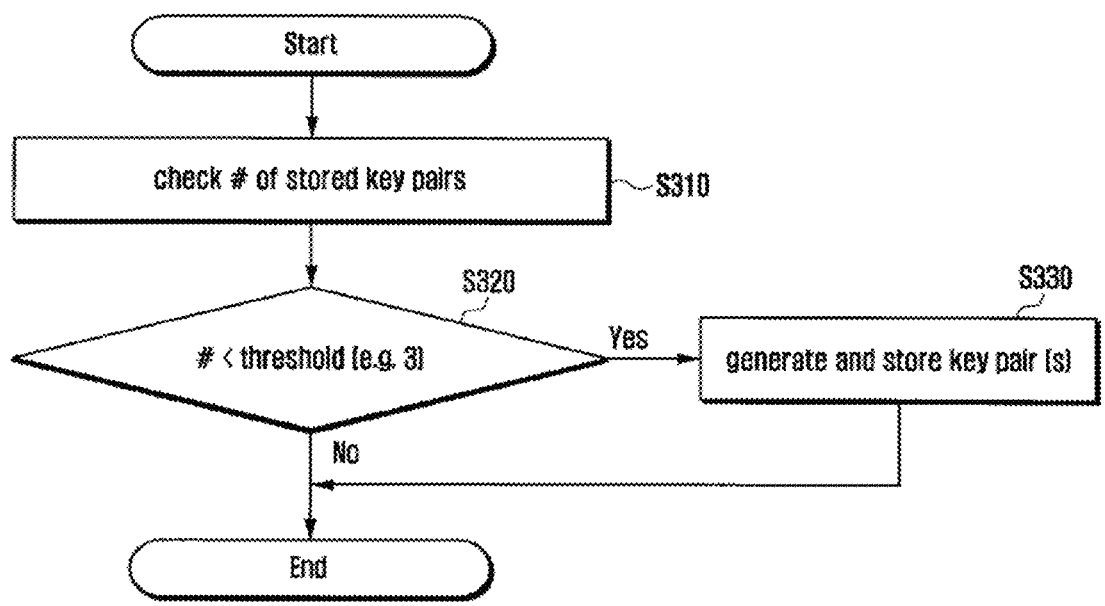
FIG. 3 is a flowchart that describes a method for an eUICC to perform the pre-generation of an ephemeral asymmetric key pair according to embodiments of the present disclosure.

FIG. 3 is a flowchart that describes a method for an eUICC to perform the pre-generation of an ephemeral asymmetric key pair according to embodiments of the present disclosure.

Referring to FIG. 3, the eUICC is capable of checking whether it needs to generate an ephemeral asymmetric key pair periodically or non-periodically in operation S310. To this end, the eUICC is capable of checking the number (#) of stored, ephemeral asymmetric key pairs.

The stored, ephemeral asymmetric key pair may or may not include an ephemeral asymmetric key pair in use.

The eUICC is capable of comparing the number of stored, ephemeral asymmetric key pairs with a preset threshold (e.g., 3) in operation S320.

When the eUICC ascertains that the number of stored, ephemeral asymmetric key pairs is less than a preset threshold (e.g., 3) in operation S320, it is capable of generating one or more ephemeral asymmetric key pairs and storing them therein in operation S330.

On the other hand, when the eUICC ascertains that the number of stored, ephemeral asymmetric key pairs is greater than or equal to a preset threshold (e.g., 3) in operation S320, it does not generate an ephemeral asymmetric key pair and performs a corresponding operation.

Although the embodiment referring to FIG. 3 is described in such a way that an eUICC checks a pre-set reference number and generates one or more ephemeral asymmetric key pairs based on the reference number, it should be understood that the present disclosure is not limited to the embodiment. For example, the embodiment can also be modified in such a way that a modem, connected to an eUICC, or a terminal (connected to an eUICC via a modem), e.g., application processor (AP), requests the eUICC to generate a key pair manually or automatically.

Figure 4:
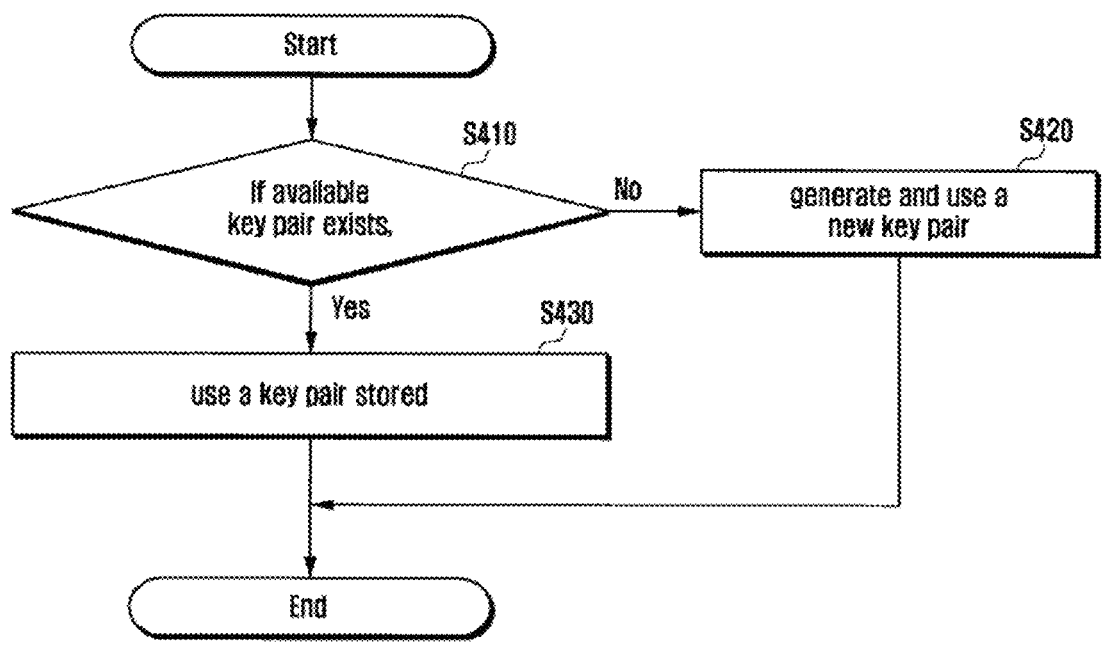
FIG. 4 is a flowchart that describes a method for a UICC to use an ephemeral asymmetric key pair which is stored or newly generated according to embodiments of the present disclosure.

FIG. 4 is a flowchart that describes a method for a UICC to use an ephemeral asymmetric key pair which is stored or newly generated according to embodiments of the present disclosure.

FIG. 4 shows detailed operations of operation S291 of the method for the UICC to download a profile shown in FIG. 2B.

The eUICC is capable of checking whether an available ephemeral asymmetric key pair exists in operation S410. When the eUICC ascertains that an available ephemeral asymmetric key pair exists in operation S410, it is capable of using the stored, ephemeral asymmetric key pair in operation S430. When the number of stored, ephemeral asymmetric key pairs is two or more, the eUICC can perform the following:

Randomly select one of a number of ephemeral asymmetric key pairs and use the selected one; and Sequentially select one of a number of ephemeral asymmetric key pairs (e.g., in order of index) and use the selected one On the other hand, when the eUICC ascertains that an available ephemeral asymmetric key pair does not exist in operation S410, it is capable of generating an ephemeral asymmetric key pair in operation S420.

Figure 5A:
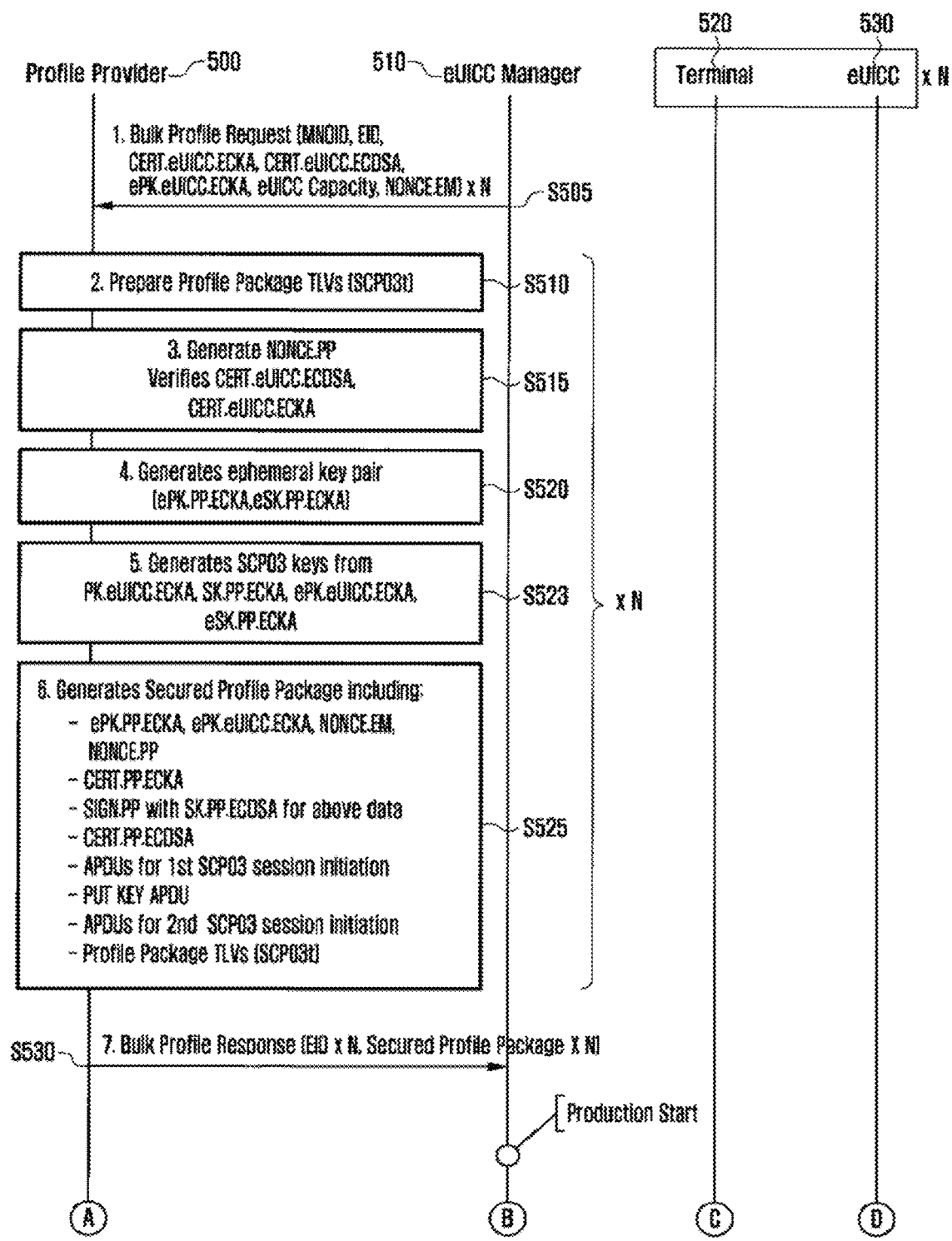
FIGS. 5A and 5B show flowcharts that describe operations of an eUICC Manager 510, a Profile Provider 500, a terminal 520, and an eUICC 530, in order to simultaneously apply processes of FIG. 2B to a number of terminals, according to an embodiment of the present disclosure.
Figure 5B:
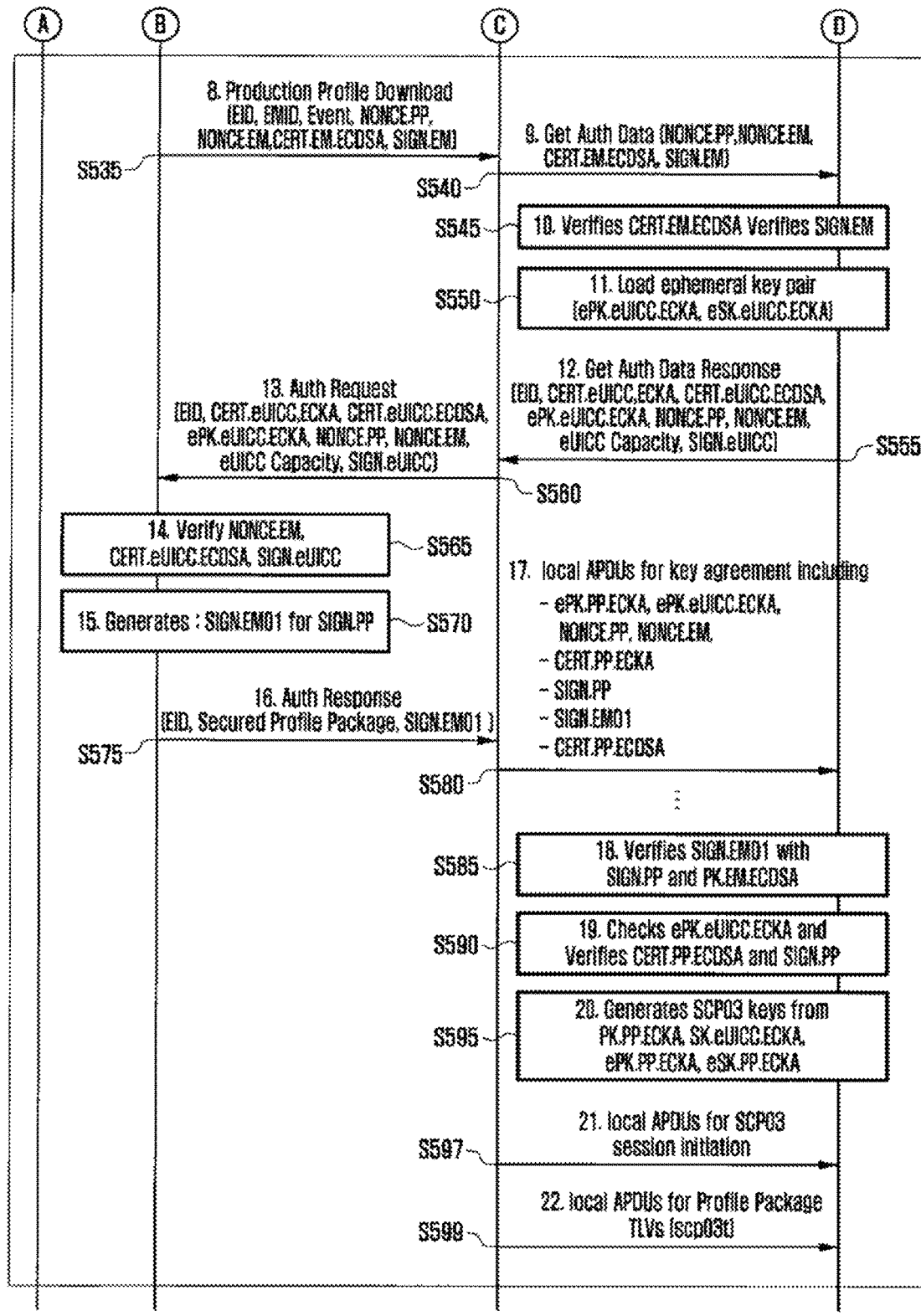

FIGS. 5A and 5B show flowcharts that describe operations of an eUICC Manager (EM) 510, a Profile Provider 500, a terminal 520, and an eUICC 530, in order to simultaneously apply processes of FIG. 2B to a number of terminals, according to an embodiment of the present disclosure.

The embodiment of FIGS. 5A and 5B is described, assuming that the EM 510 needs to include encrypted profiles of N (positive integer) until a specific time point.

To this end, the EM 510 is capable of including a number of ephemeral ePK, e.g., N, stored therein. When the EM 510 transmits the stored, N ephemeral ePK to the PP 500, the PP 500 is capable of generating encrypted profiles for a number of terminals and then transmitting the generated profiles to the EM 510.

The embodiment of FIGS. 5A and 5B is described, assuming that the operations are performed under normal conditions. It should be understood that this condition is only assumed, for the sake of convenience; therefore, all the operations are not unconditionally performed. That is, when the verification of validity of information according to individual processes fails, a corresponding process can be stopped or an error message Error can be transmitted to a sender that has transmitted the information.

The embodiment of FIGS. 5A and 5B is described in detail below.

The EM 510 is capable of transmitting, to the PP 500, a message containing one or more information items for eUICCs of N (positive integer), described below, in operation S505. The embodiment uses a bulk profile request message as the message for transmitting the information described below, but is not limited thereto. Examples of the information that the EM 510 transmits to the PP 500 are as follows:

MNOID: It refers to an identifier identifying an operator (e.g., PLMN ID). It can be transmitted along with the following information or in a separate way;

eUICC Identifier (an identifier identifying an eUICC);

CERT.eUICC.ECKA (a certificate available in generating encryption and decryption keys by PP). The ECKA indicates that Elliptic Curved Key Agreement algorithm has been used;

CERT.eUICC.ECDSA (a certificate capable of authenticating an eUICC and verifying the signature of an eUICC). The ECDSA refers to the Elliptic Curve Digital Signature Algorithm;

ePK.eUICC.ECKA (an ephemeral public key of eUICC— ephemeral Public Key of eUICC). A corresponding ePK.eUICC.ECKA value can refer to a value that previously reads a value stored in the EMs according to EIDs and transmits the read value. When a number of ePK.eUICC.ECKA values per EID are stored and one of them needs to be selected, it must be selected in order to be used in the eUICC. The method of selecting the order can be a method of the same sequence as the eUICC and EM have stored ePK.eUICC.ECKA, used the same value and then deleted the used value. In this case, the eUICC is capable of storing an ePK.eUICC.ECKA to be used in a particular EM, separately, so that it can maintain the sequence in downloading profiles via other EMs. For example, the eUICC can use ePK.eUICC.ECKA in preset orders according to EMs, employing identifiers identifying the EMs;

eUICC Capacity information: Information regarding a memory or buffer of an eUICC. It is used: when a PP performs the division of profiles and encrypts the divided profiles, so that the divided profiles do not have a size greater than or equal to a preset value in the memory or buffer of an eUICC; and NONCE.EM: A random value created in an EM. An EM can verify the authentication requested by an eUICC, using the signature of the eUICC containing the NONCE.EM.

The EM 510 is capable of transmitting N sets to the PP 500 and the information items (a set of information) to N eUICCs in operation S505.

As described above, a message for transmitting the information can be Bulk Profile Request. The message serves to transmit the information and to receive N profiles from the PP; however, it should be understood that the message is not limited by the name or terminology.

The PP 500 is capable of encrypting a profile of an MNO corresponding to the MNOID (hereafter called an encrypted profile) in operation S510.

When the PP 500 performs the division of profiles and encrypts the divided profiles (see the description referring to FIG. 2A), the division size can be set to be less than or equal to: a preset threshold; or a threshold referring to information contained in the eUICC Capacity. On the other hand, when the PP 500 is not able to perform the division of profiles, it can transmit error information Error to the EM, referring to information contained in the eUICC Capacity.

The encryption key that the PP 500 uses to directly encrypt a profile can employ one of the following methods:
  randomly generating a symmetric key (encryption key K1), and using a symmetric key (encryption key K2) calculated and generated from the symmetric key; and
  using a randomly created symmetric key (encryption key K1)

The PP 500 is capable of generating NONCE.PP in operation S515. The PP 500 is capable of verifying CERT.eUICC.ECDSA and CERT.eUICC.ECKA by using the stored CI certificate or the stored CI public key. When the verification fails, the PP 500 is capable of transmitting the error information Error to the EM 510.

The PP 500 is capable of generating its ephemeral asymmetric key pair (e.g., ePK.PP.ECKA and eSK.PP.ECKA) in operation S520.

The PP 500 is capable of generating a shared key (Shared Secret) by using PK.eUICC.ECKA (a public key of the eUICC), SK.PP.ECKA (a private key of the PP), ePK.eUICC.ECKA (an ephemeral public key of the eUICC), and eSK.PP.ECKA (an ephemeral private key of the PP) in operation S523.

The PK.eUICC.ECKA can use a value contained in CERT.eUICC.ECKA.

The PP 500 is capable of generating encrypted profile installation information (Secured Profile Package) in operation S525. The encrypted profile installation information can contain one or more information items as follows:
  the generated ePK.PP.ECKA;
  the received ePK.eUICC.ECKA;
  the received NONCE.EM;
  the generated NONCE.PP;
  the CERT.PP.ECKA (a certificate available in generating encryption and decryption keys by the eUICC);
  SIGN.PP: a signature value for signing information containing the information by using SK.PP.ECDSA (a private key of PP for signature);
  CERT.PP.ECDSA (a certificate for verifying a signature of the PP);

APDU information for changing an encryption key, which can have the following

Encrypted profiles (Profile Package TLVs in operation 6 of FIGS. 5A and 5B);

APDU information for changing an encryption key, the APDU information can have the following:

Method 1: When encryption key 2 (i.e., K2) is used to encrypt profiles in operation S510, The APDU can include the following:

A certificate message which has used an encryption key 3 which is calculated using a shared key which is generated in operation S523;

A certificate key change message including an encryption key1 which is encrypted using encryption key 4 which is generated via authentication of the certificate message; and/or A certificate message using the encryption key1;

The certificate message can be SCP03;

The certificate key change message can be a message PUK KEY;

Method 2: When encryption key 1 (i.e., K1) is used to encrypt profiles in operation S510, The APDU can include the following:

An encryption key change message including an encryption key1 which is encrypted using encryption key 3 which is calculated using a shared key which is generated in operation S523.

The encryption key change message can be a STORE message or a PUT KEY message, to which an identifier representing an encryption key change message is added.

Operation S525 and operations thereafter in FIGS. 5A and 5B will be described, for the sake of convenience, based on Method 1; however, it should be understood that the operations can also be processed via Method 2 in a similar way as Method 1.

It should be understood that operations S510 to S525 can be processed N number of times for each eUICC.

Operation S510 can be processed using a value that has been previously generated and stored, without generating values according to eUICCs.

The PP 500 transmits the following information to the EM in operation S530. Although the embodiment referring to FIGS. 5A and 5B is described in such a way that the information described below is contained in a message Bulk Profile Response and transmitted along therewith, it should be understood that the information is not limited by the name of message.

EID; and/or

Encrypted profile information generated in operation S525.

The information refers to a response message with respect to information requesting N profiles requested in operation S505. The information includes N items. As described above, the response message can be a Bulk Profile Response.

The EM 510 is capable of storing the information received from the PP 500 and retaining it for a period of time.

FIG. 5B shows a process among EM 510, terminal 520 and eUICC 530 in operations S535 to S599.

The process of operations S535 to S599 can be performed for a number of terminals, N (positive integer), simultaneously or separately. In this case, operations S535 to S599 for the N terminals need not affect to each other.

The EM 510 transmits the information described below to the terminal 520 connected to the eUICC 530 corresponding to EID in operation S535.

In this case, the EM 510 can transmit the information to the terminal via the direct transmission or the DPF 150 shown in FIG. 1. Alternatively, the terminal can request the information from the EM 510 and then receive it therefrom.

EID;

eUICC Manager Identifier (EMID): It can contain access information to EM;

Event: It can inform a terminal that a profile needs to be downloaded;

NONCE.PP;

NONCE.EM;

SIGN.EM: It refers to a signature value of EM. SIGN.EM is a value signed by using SK.EM.ECDSA (an EM private key for signature) containing part or all of the information;

CERT.EM.ECDSA: a certificate of EM for signature; and/or

Identifier information indicating that an ephemeral eUICC public key (ePK.eUICC.ECKA) stored in EM is used: The identifier information can be transmitted to the terminal separately. Alternatively, the identifier can be determined by the terminal or eUICC, referring to part of the transmitting information. The reference information can be information, contained in Event, or CERT.EM.ECDSA.

The terminal 520 is capable of transmitting the following information to the eUICC 530 in operation S540.

EID;

Event;

NONCE.PP;

NONCE.EM;

CERT.EM.ECDSA; and/or

SIGN.EM.

The information can be transmitted via one APDU message or a number of APDU messages. The messages can be a Get Auth Data message.

When the information is transmitted via a number of APDU messages, it can contain an identifier indicating the last APDU. In the APDU messages, the identifier distinguishes information items via information P1 and P2 or by including specific information.

The eUICC 530 performs the following operations.

The eUICC 530 verifies the validity of a CERT.EM.ECDSA (a certificate of EM for signature) transmitted by using a public key of a CI or a CI certificate stored in the eUICC in operation S545. The eUICC 530 extracts PK.EM.ECDSA (a public key of EM for signature verification) from the CERT.EM.ECDSA. The PK.EM.ECDSA can be stored in the eUICC for future uses. The eUICC 530 verifies the validity of the SIGN.EM using information transmitted via operation S540 and the PK.EM.ECDSA.

When the verification is successful, the eUICC 530 can trust the value of the information.

The eUICC 530 generates an ephemeral eUICC asymmetric key pair or loads an ephemeral eUICC asymmetric key pair that has been previously generated and stored in operation S550.

When the eUICC 530 identifies a preset EM, using the CERT.EM.ECDSA, received as in operation S540, or an EMID value or PK.EM.ECDSA, contained in the CERT.EM.ECDSA, it can load an ephemeral asymmetric key pair which has been stored separately.

The eUICC 530 is capable of transmitting one or more items of information described below to the terminal 520 in operation S555.

EID;

CERT.eUICC.ECKA;

ePK.eUICC.ECKA: an ephemeral eUICC public key generated or loaded as described above;
NONCE.PP;
NONCE.EM;
eUICC Capacity;
  SIGN.eUICC: It generates and includes a signature value signed by using SK.eUICC.ECDSA, containing part of all of the information; and/or/or
CERT.eUICC.ECDSA The information can be transmitted via one APDU message or a number of APDU messages.

The messages can be a Get Auth Response message.

When the information is transmitted via a number of APDU messages, it can contain an identifier indicating the last APDU. The identifier can be distinguished via Status Word (SW1, SW2) or by including specific information.

The terminal 520 is capable of transmitting one or more items of information described below to the EM 510 in operation S560.
  EID;
  CERT.eUICC.ECKA;
  CERT.eUICC.ECDSA;
  ePK.eUICC.ECKA;
  NONCE.PP;
  NONCE.EM;
  eUICC Capacity; and/or/or
  SIGN.eUICC The message transmitting the information can be an Auth Request message.

The EM 510 is capable of performing the following processes in operation S565.
  to verify the validity of CERT.eUICC.ECDSA using its CI;
  to verify a signature value of the eUICC (SIGN.eUICC) with respect to the received information; or
  to ascertain that the received, NONCE.EM value is a value transmitted from the EM;

The EM 510 is capable of authenticating the eUICC 530 via the verification of a signature and the ascertainment of a NONCE.EM value.

The EM 510 is capable of performing the following process in operation S570.
  to generate an SIGN.EM01 value signed by using an SK.EM.ECDSA (a private key of EM for signature), containing part of all of the information transmitted from the PP 500. Part of the information can be SIGN.PP. In the following description, for the sake of convenience, a value of SIGN.PP signed using an SK.EM.ECDSA will be expressed as SIGN.EM01.

In order to increase in the processing speed of the EM 510, operation S570 can be performed between operations S530 and S560 and the result can be stored.

The EM 510 is capable of transmitting the following information to the terminal 520 in operation S575.
  EID;
  Encrypted profile information (Secured Profile Package); and/or
  SIGN.EM01;

The information can be a response message to the Auth Request of operation 13 (operation S560).

The terminal 520 is capable of performing the following processes in operation S580.
  to transmit information for key agreement of a shared key between the PP 500 and the eUICC 530, from among the information received as in operation S575, to the eUICC, via one APDU or a number of APDU. The information can contain the followings:
    ePK.PP.ECKA;
    ePK.eUICC.ECKA;
    NONCE.PP, NONCE.EM;
    CERT.PP.ECKA;
    SIGN.PP;
    SIGN.EM01; and/or
    CERT.PP.ECDSA.

The eUICC 530 is capable of performing the following process in operation S585.
  to verify SIGN.EM01, verified with respect to SIGN.PP, by using PK.EM.ECDSA.

The eUICC 530 is capable of performing the following processes in operation S590.
  to verify the validity of CERT.PP.ECDSA, by using the CI certificate or CI public key, stored in the eUICC;
  to extract PK.PP.ECDSA from CERT.PP.ECDSA when the certificate is valid;
  to verify the SIGN.PP (PP signature value) by using the PK.PP.ECDSA; and/or
  to compare a value of a received ePK.eUICC.ECKA with that of the ePK.eUICC.ECKA that the eUICC transmitted as in operation S555, when the signature is valid, in order to verify whether they are identical to each other When the transmitted ePK.eUICC.ECKA value and the received ePK.eUICC.ECKA value are identical to each other and the SIGN.PP has been verified, the eUICC is capable of authenticating the PP.

The eUICC 530 is capable of generating a shared key (Shared Secret) by using the PK.PP.ECKA (a public key of the PP), SK.eUICC.ECKA (a private key of the eUICC), ePK.PP.ECKA (an ephemeral public key of the PP), and eSK.eUICC.ECKA (an ephemeral private key of eUICC) in operation S595.

In this case, the PK.SK.ECKA can use a value contained in the CERT.eUICC.ECKA.

The shared key can be generated to have the same value as the shared key generated as in operation S523.

After completing operation S595 and operations before it, the eUICC 530 is capable of transmitting, to the terminal, one or more responses corresponding to one or more APDU messages transmitted as in operation S580, thereby informing the terminal that operation S595 and operations before it has been completed.

After completing operations S580 to S595, the terminal 520 is capable of executing one or more APDU from among the encrypted profile information (Secured Profile Package) included as in operations S525 to S575, and generating a key for decrypting encrypted data.

In this case, the APDU can be an APDU corresponding to Method 1 or Method 2 as in operation S525. When the APDU is an APDU corresponding to Method 1, it can contain the following.
  INITIALIZE UPDATE and EXTERNAL AUTHENTICATE messages for the creation of the first SCP 03 session;
  PUK KEY command for the change of SCP03 key; and/or
  INITIALIZE UPDATE 및 EXTERNAL AUTHENTICATE messages for the creation of the second SCP 03 session.

After that, the terminal 520 is capable of allocating the encrypted profile to one or more APDU messages, and transmitting them to the eUICC 530 via the APDU messages in operation S597.

After receiving the APDU messages, the eUICC 530 is capable of decrypting the profile information, in a unit of one APDU message or a number of APU messages, by using the encryption key generated in operation S597, and then installing the profile.

After installing the profile, the eUICC 530 can delete the used, ephemeral asymmetric key pair.

Although it is not shown, when the profile has been installed, the terminal 520 can inform the EM 510 of the installation of the profile; and the EM 510 can delete the used, ephemeral eUICC public key or can update the information to indicate a use-complete state.

Although the embodiment referring to FIG. 5 is described in such a way that an eUICC recognizes a specific condition (or event) and downloads a profile (profiles) using the stored key pairs, it should be understood that the present disclosure is not limited to the embodiment.

An example of the specific condition can be a state where an eUICC is in a particular state (e.g., State A) on a specific state machine (State Machine).

Another example of the specific condition can be a state where an eUICC is in a particular state (e.g., State A) on a specific state machine (State Machine) and switches its state (e.g., State A) to another state (e.g., State B) according to a specific command received from a terminal.

FIGS. 6A and 6B show diagrams that describe a method of managing an ephemeral asymmetric key pair in an eUICC according to an embodiment of the present disclosure.

FIG. 6A shows a table of ephemeral asymmetric key pairs included in a particular EM (e.g., EM1). FIG. 6B is a table of ephemeral asymmetric key pairs according to individual EMs, included in an eUICC.

Referring to FIGS. 6A and 6B, the eUICC is capable of identifying ephemeral asymmetric key pairs to be used for individual EMs, and managing them.

The eUICC needs to identify EMs that it can communicate with. The eUICC is capable of identifying a particular EM by using the identifier (ID) of the EM, the certificate, the public key, etc.

The ephemeral asymmetric key pair stored for EM1 can be used only when a profile is downloaded via the EM1. Similarly, the ephemeral asymmetric key pair stored for EM2 can be used only when a profile is downloaded via the EM2.

According to the schemes described above, EM1 is capable of using an ephemeral public key stored in a corresponding eUICC. The EM1 can select an ephemeral public key for a specific eUICC as per the following modes.

Sequential use: eUICC needs to use keys in the same sequence as EM1; and/or

Random use: EM can transmit, an eUICC, an ephemeral public key to be used for a message transmitted as in operation S540 of FIG. 5; when ascertaining that the ephemeral public key is contained in a stored asymmetric key pair, the eUICC can use the asymmetric key pair.

eUICC can have eUICC Policy Rule (EPR) set therein. Although it is not shown, EPR can be set in eUICC in the manufacturing process or via a remote mode by an EM having a specific encryption key.

The EPR can contain the following:

Policy rule identifier: It indicates a type of EPR. For example, the type EPR can be a rule for allowing a specific eUICC Manager to use an ephemeral asymmetric key stored separately; and/or Server information: It sets one or more public keys of one or more EMIDs or EMs and specifies an EM, such as EM1 shown in FIGS. 6A and 6B.

The EPR can contain a condition as to whether ePK will be used for a specific EM.

In this case, the EM informs the PP of the condition in operation S505 of FIG. 5, so that the PP can generate a shared key without using ePK in operation S525 of FIG. 5.

Similarly, the EM informs the eUICC of the condition in operation S540 of FIG. 5, so that the eUICC can generate a shared key without using ePK in operation S595 of FIG. 5.

Figure 7:
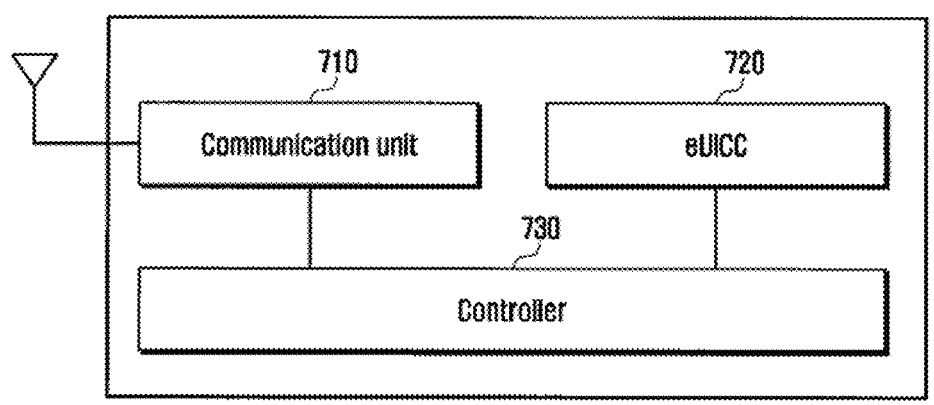
FIG. 7 illustrates a block diagram showing the configuration of a terminal according to an embodiment of the present disclosure.

FIG. 7 illustrates a block diagram showing the configuration of a terminal according to an embodiment of the present disclosure.

As shown in FIG. 7, the terminal is capable of including a communication unit 710, an eUICC 720 and a controller 730.

The communication unit 710 is capable of transmission/reception of signals to/from other nodes in a mobile communication system. For example, the communication unit 710 is capable of communicating with EM. The communication unit 710 is capable of including a radio frequency (RF) transmitter for up-converting the frequency of signals to be transmitted and amplifying the signals and an RF receiver for low-noise amplifying received RF signals and down-converting the frequency of the received RF signals. The communication unit 710 is capable of receiving data via a radio channel and transferring it to the controller 730. The communication unit 710 is also capable of receiving data from the controller 730 and transmitting it via a radio channel.

The eUICC 720 refers to a smart card which: is inserted into the terminal; has personal information about a mobile communication subscriber, such as network access authentication information, a phonebook, Short Message Service (SMS), etc., stored therein; and performs subscriber authentication and traffic security key generation when the terminal is connected to a mobile communication network such as Global System for Mobile Communications (GSM), Wideband Code Division Multiple Access (WCDMA), Long Term Evolution (LTE), etc., thereby enabling it to perform safe mobile communication. The eUICC 720 can be implemented in such a way that it is embedded in a terminal (an embedded type of eUICC) or detachably installed into a terminal (a removable type of eUICC). The configuration of a removable type of eUICC will be described later referring to FIG. 8.

The eUICC 720 has communication applications mounted therein, e.g., Subscriber Identification Module (SIM), Universal SIM (USIM), or Internet Protocol (IP) multimedia SIM (ISIM), etc., depending on types of mobile communication network the subscriber accesses to. The eUICC 720 provides an upper-level security function for mounting various applications such as an electronic wallet, ticketing, electronic passports, and the like.

The eUICC 720 can further include a memory for storing profiles and a controller for downloading and/or installing profiles.

The eUICC can also be called an electronic device or a small electronic device.

In this case, the electronic device generates an encryption key at a time point and stores the encryption key in the memory of the eUICC. When receiving profile download start information from a profile providing server, the electronic device, loads the stored encryption key from the memory, downloads an encrypted profile for the electronic device from the profile providing server, by using the loaded encryption key, and installs the downloaded profile. In this case, the encryption key includes an ephemeral (or temporary) asymmetric key pair.

The electronic device transmits its public key and its ephemeral public key to the profile providing server. The electronic device generates a shared key, by using its ephemeral private key, its private key, an ephemeral public key of the profile providing server, and a public key of the profile providing server, received from the profile providing server.

The electronic device decrypts the encrypted profile, based on the shared key, and installs the decrypted profile.

The electronic device can delete its ephemeral private key and/or its ephemeral public key.

The electronic device can generate and store a security key at one of the following: a time point that the electronic device is manufactured; a time point when the profile is downloaded and installed; a periodically or non-periodically created time; and a time point when a command for requesting the creation of the security key is received.

The controller 730 is capable of controlling signals flowing among the blocks of the terminal, so that the terminal can perform the functions as a mobile communication device.

The controller 730 according to embodiments of the present disclosure is capable of controlling the transmission of signals from the eUICC 720 to external devices, such as servers, etc., thorough the communication unit 710. The controller 730 is capable of controlling the transfer of information (e.g., profiles, etc.), received from external devices such as servers via the communication unit 710, to the eUICC 720.

Figure 8:
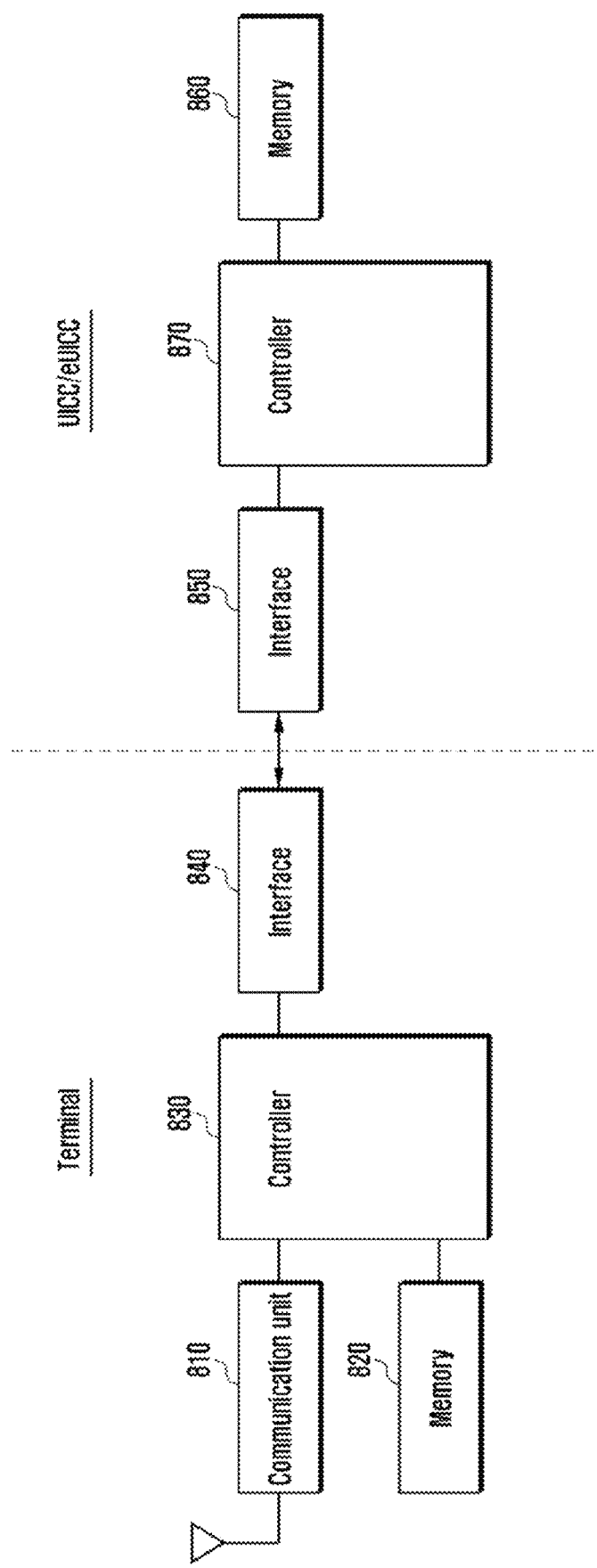
FIG. 8 illustrates block diagrams of the configuration of an eUICC and a terminal according to another embodiment of the present disclosure.

FIG. 8 illustrates block diagrams of the configuration of an eUICC and a terminal according to another embodiment of the present disclosure.

FIG. 8 shows an embodiment configured in such a way that an eUICC is detachably installed into a terminal, in comparison with the embodiment of FIG. 7 where the eUICC is embedded in the terminal.

As shown in FIG. 8, the terminal is capable of including a communication unit 810, a memory 820, a controller 830, and an interface 840.

The communication unit 810 and the controller 830 correspond to the communication unit 710 and the controller 730 shown in FIG. 7, respectively.

The interface 840 is connected to a UICC/eUICC and provides a pathway transferring signals between the terminal and the UICC/eUICC. For example, when the terminal receives a profile from an external server via the communication unit 810, the profile can be transferred to the UICC/eUICC via the interface 840 under the control of the controller 830.

As shown in FIG. 8, the UICC/eUICC is capable of including an interface 850, a memory 860 and a controller 870.

The interface 850 connects the UICC/eUICC to the terminal and provides a pathway transferring signals between the terminal and the UICC/eUICC. For example, the controller 870 of the UICC/eUICC transfers a message, which will be transmitted to an external server, to the terminal via the interface 850.

The controller 870 controls the UICC/eUICC to download profiles from an external server and to install the profiles therein. The controller 870 is also capable of controlling the functions of the eUICC 720 shown in FIG. 7.

Figure 9:
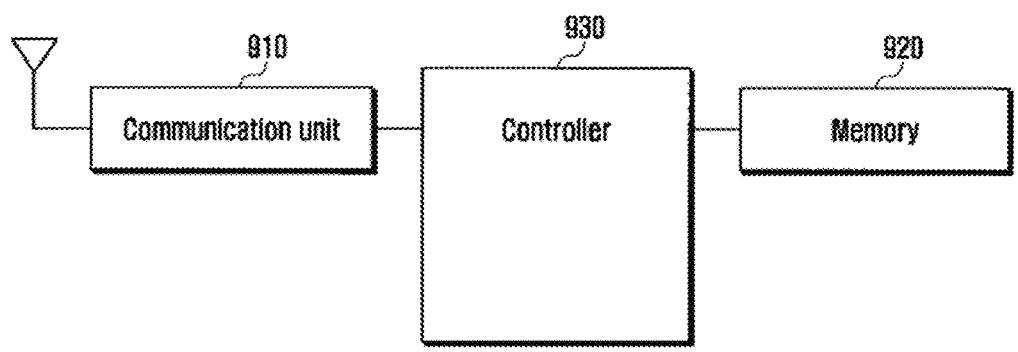
FIG. 9 illustrates a block diagram showing the configuration of a profile management server according to an embodiment of the present disclosure.

FIG. 9 illustrates a block diagram showing the configuration of a profile management server according to an embodiment of the present disclosure.

As shown in FIG. 9, the profile management server is capable of including a communication unit 910, a memory 920 and a controller 930.

The communication unit 910 is capable of transmission/reception of signals to/from a terminal or an eUICC of the terminal.

The memory 920 is capable of storing profiles of eUICCs.

The controller 930 is capable of controlling signals related to operations of the profile management server. For example, the controller 930 is capable of controlling the generation and storage of a number of ephemeral public keys and the mapping of the stored, ephemeral public keys to a number of electronic devices. The controller 930 is capable of controlling the transmission of the ephemeral public keys to a profile providing server and the reception of encrypted profiles for the electronic devices, based on the ephemeral public keys, from the profile providing server.

In this case, the electronic device can include a UICC or an eUICC.

As described above, embodiments of the present disclosure are capable of rapidly processing the opening of communication services for an eUICC terminal.

According to embodiments of the present disclosure, the methods described in the specification and the claims can be implemented with hardware, software, or a combination thereof.

When the methods are implemented with software, computer-readable storage media can be provided to store one or more programs (software modules). One or more programs stored in the computer-readable storage media are configured for execution by one or more processors in the electronic devices. One or more programs include instructions for enabling the electronic device to execute the methods according to embodiments described in the claims or in the description.

These programs (software modules and software) are stored in: Random Access Memory (RAM), flash memory, non-volatile memory, Read Only Memory (ROM), Electrically Erasable Programmable Read Only Memory (EEPROM), magnetic disc storage device, Compact Disc-ROM (CD-ROM), Digital Versatile Discs (DVDs) or other types of optical storage device, magnetic cassette, etc. or a combination thereof. In addition, two or more of the same type of memories form a memory block.

The programs can also be stored in an attachable storage device accessible through a communication network, such as Internet, Intranet, Local Area Network (LAN), Wide Area Network (WAN), Storage Area Network (SAN) or a combination thereof. This storage device can be connected to the apparatus according to the present disclosure via external ports. A separate storage device of a communication network can be connected to the apparatus according to the present disclosure.

The terms as used in embodiments of the present disclosure are merely for the purpose of describing particular embodiments and are not intended to limit the present disclosure. Singular forms are intended to include plural forms unless the context clearly indicates otherwise. Although the embodiments are described separately, it should be understood that two or more of the embodiments can also be integrated to form another modification.

In addition, the embodiments of the present disclosure can be implemented by computer readable codes in a computer readable recording medium. The computer readable recording medium can be a data storage device capable of storing data read by computer systems. Examples of the computer readable recording medium are Read-Only Memory (ROM), volatile or non-volatile memory, CD-ROM, magnetic tapes, floppy disks, optical data storage devices, carrier waves (data transmission via the Internet), etc. Through the disclosure, programmers of ordinary skill in the art to which the disclosure pertains can easily implement functional programs, codes, and code segments for making and using the present disclosure.

It will be appreciated to those skilled in the art that the apparatus and method according to embodiments of the present disclosure can be implemented with hardware, software or a combination thereof. Software programs can be recorded in or read out storage media, simultaneously, optically, mechanically, via a machine (e.g., computer), regardless of a condition as to whether the software programs can be deleted or re-recorded. Examples of the storage media are volatile or non-volatile storage device such as ROM, etc., memory such as RAM, memory chip, IC, etc., optical or magnetic recording device such as CD, DVD, magnetic disk, magnetic tape, etc. The methods according to embodiments of the present disclosure may be implemented by: network entities such as servers that communication operators manages in wireless communication systems; computers including controllers and memory devices; mobile devices; etc. It will be appreciated that the memory is an example of the storage media in and from which a machine can store and read a program or programs including instructions for implementing embodiments of the present disclosure.

Therefore, the embodiments of the present disclosure include storage media in or from which a machine (e.g., a computer, etc.) can store and read a program and programs including codes to implement the apparatus or method described in the claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method of downloading a profile by an electronic device including a transceiver, a processor and a universal integrated circuit card (UICC) in a wireless communication system, the method comprising:
storing, by the UICC, a one-time key pair including a one-time public key of the UICC;
obtaining, by the UICC from the processor after the storing, a command for initiating a download of the profile, the command being received from a profile providing server by the processor;
generating, by the UICC, information for requesting the profile based on the command, wherein the information includes the one-time public key of the UICC and is delivered to the processor;
transmitting, by the processor to the profile providing server, a message including the information generated by the UICC; and
receiving, by the processor from the profile providing server, the profile for the UICC based on the message, the profile being delivered to the UICC.

2. The method of claim 1, wherein the one-time key pair further includes a one-time private key of the UICC, the one-time private key being asymmetric to the one-time public key.

3. The method of claim 1, wherein the one-time public key is used to generate a shared key for an encryption of the profile.

4. The method of claim 1, wherein the profile is installed in the UICC.

5. The method of claim 1, further comprising generating, by the UICC, a new one-time key pair to generate the information, in case that the one-time key pair is not stored in the UICC.

6. An electronic device for downloading a profile in a wireless communication system, the electronic device comprising:
a transceiver configured to transmit and receive a signal;
a processor; and
a universal integrated circuit card (UICC),
wherein the UICC is configured to:
store a one-time key pair including a one-time public key of the UICC,
obtain, from the processor after the storing, a command for initiating a download of the profile,
generate information for requesting the profile based on the command, the information including the one-time public key of the UICC, and
deliver, to the processor, the generated information,
wherein the processor is configured to:
receive, from a profile providing server, the command for initiating the download of the profile,
transmit, to the profile providing server, a message including the information generated by the UICC,
receive, from the profile providing server, the profile for the UICC based on the message, and
deliver, to the UICC, the profile.

7. The electronic device of claim 6, wherein the one-time key pair further includes a one-time private key of the UICC, the one-time private key being asymmetric to the one-time public key.

8. The electronic device of claim 6, wherein the one-time public key is used to generate a shared key for an encryption of the profile.

9. The electronic device of claim 6, wherein the UICC is further configured to install the profile.

10. The electronic device of claim 6, wherein the UICC is further configured to generate a new one-time key pair to generate the information, in case that the one-time key pair is not stored in the UICC.

11. A method of providing a profile by a server in a wireless communication system, the method comprising:
transmitting, to an electronic device, a command for initiating a download of the profile;
receiving, from the electronic device, a message including information for requesting the profile, wherein the information includes a one-time public key of a universal integrated circuit card (UICC) of the electronic device and is generated by the UICC; and
transmitting, to the electronic device, the profile for the UICC based on the message,
wherein a one-time key pair including the one-time public key of the UICC is stored in the UICC of the electronic device prior to the transmitting of the command, and
wherein the information is generated based on the command for initiating the download of the profile, the command being obtained by the UICC after storing of the one-time key pair.

12. The method of claim 11, wherein the one-time key pair further includes a one-time private key of the UICC, the one-time private key being asymmetric to the one-time public key.

13. The method of claim 11, wherein the one-time public key is used to generate a shared key for an encryption of the profile.

14. The method of claim 11, wherein the profile is installed in the UICC.

15. The method of claim 11, wherein a new one-time key pair is generated by the UICC to generate the information, in case that the one-time key pair is not stored in the UICC.

16. A server for providing a profile in a wireless communication system, the server comprising:
a transceiver configured to transmit and receive a signal; and
a controller configured to:
transmit, to an electronic device, a command for initiating a download of the profile,
receive, from the electronic device, a message including information for requesting the profile, wherein the information includes a one-time public key of a universal integrated circuit card (UICC) of the electronic device and is generated by the UICC, and
transmit, to the electronic device, the profile for the UICC based on the message,
wherein an one-time key pair including the one-time public key of the UICC is stored in the UICC of the electronic device prior to the transmitting of the command, and
wherein the information is generated based on the command for initiating the download of the profile, the command being obtained by the UICC after storing of the one-time key pair.

17. The server of claim 16, wherein the one-time key pair further includes a one-time private key of the UICC, the one-time private key being asymmetric to the one-time public key.

18. The server of claim 16, wherein the one-time public key is used to generate a shared key for an encryption of the profile.

19. The server of claim 16, wherein the profile is installed in the UICC.

20. The server of claim 16, wherein a new one-time key pair is generated by the UICC to generate the information, in case that the one-time key pair is not stored in the UICC.

* * * * *